US008097319B2

(12) United States Patent
Wu

(10) Patent No.: US 8,097,319 B2
(45) Date of Patent: Jan. 17, 2012

(54) DIAMOND-CONTAINING NANOCOMPOSITE INTERFACIAL LAYER IN FUSERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 431 days.

(21) Appl. No.: 12/400,899

(22) Filed: Mar. 10, 2009

(65) Prior Publication Data

US 2010/0233465 A1 Sep. 16, 2010

(51) Int. Cl.

| | |
|---|---|
| ***B29D 22/00*** | (2006.01) |
| ***B29D 23/00*** | (2006.01) |
| ***B32B 1/08*** | (2006.01) |
| ***B32B 5/16*** | (2006.01) |
| ***F16L 11/04*** | (2006.01) |

(52) U.S. Cl. .................................... 428/36.91; 428/323

(58) Field of Classification Search ............... 428/36.91, 428/323

See application file for complete search history.

(56) References Cited

U.S. PATENT DOCUMENTS

| | | | | |
|---|---|---|---|---|
| 7,541,079 | B2 * | 6/2009 | Kuntz et al. | ................ 428/36.91 |
| 2008/0152405 | A1 | 6/2008 | Kuntz et al. | |

* cited by examiner

*Primary Examiner* — Nathan M Nutter

(74) *Attorney, Agent, or Firm* — MH2 Technology Law Group LLP

(57) ABSTRACT

Exemplary embodiments provide a fuser member containing an interfacial layer and methods for forming the interfacial layer and the fuser member. In one embodiment, the fuser member can include a substrate, a resilient layer, a surface layer and an interfacial layer disposed between the resilient layer and the surface layer. The resilient layer can include, for example, a silicone rubber layer and the surface layer can include, for example, a fluoropolymer such as a fluoroplastic of PFA or PTFE. The interfacial layer can include a diamond-containing polymer composite to provide improved thermal/electrical/mechanical properties. The surface layer and the fuser member can thus be treated at a temperature of about 250° C. or higher with high quality and an improved adhesion between layers of the fuser member.

12 Claims, 3 Drawing Sheets

DIAMOND-CONTAINING NANOCOMPOSITE INTERFACIAL LAYER IN FUSERS

DESCRIPTION OF THE INVENTION

1. Field of the Invention

This invention relates generally to an interfacial layer and, more particularly, to a diamond-containing interfacial layer and related members used for electrophotographic devices, and methods for making the diamond-containing interfacial layer and related members.

2. Background of the Invention

In electrophotography (also known as xerography, electrophotographic imaging or electrostatographic imaging), an imaging process includes forming a visible toner image on a support surface (e.g., a sheet of paper). The visible toner image is often transferred from a photoreceptor that contains an electrostatic latent image and is usually fixed or fused onto a support surface to form a permanent image using a fuser. For example, the fuser can include a surface release layer made of fluoroplastics (e.g., perfluoroalkoxy (PFA), or polytetrafluoroethylene (PTFE)) that is coated on a resilient silicone rubber layer. The fluoroplastic surface can enable oil-less fusing and the conformable silicone rubber layer can enable rough paper fix, low mottle, and good uniformity. In some fusers, primer layers, such as tie layers, have been used between the silicone rubber layer and the surface release layer to facilitate the adhesion therebetween.

The fluoroplastics are often crystalline materials and require high baking temperatures, typically over 300° C., to form films. Problems arise, however, since the underlying silicone rubber starts to degrade at about 250° C. It is therefore difficult to achieve uniform fuser films without defects, even if the formation process conditions, such as the baking temperatures, the ramping temperatures and primer layer types and thickness can be tuned as desired.

Thus, there is a need to overcome these and other problems of the prior art and to provide an interfacial composite layer in a fuser member and methods for forming the interfacial composite layer and the fuser member.

SUMMARY OF THE INVENTION

According to various embodiments, the present teachings include a fuser member. In one embodiment, the fuser member can include a substrate; a resilient layer; an interfacial layer and a surface layer. The surface layer can be disposed over the resilient layer, which is disposed over the substrate. The interfacial layer can be disposed between the surface layer and the resilient layer and can include a plurality of diamond-containing particles dispersed in a polymer matrix.

According to various embodiments, the present teachings also include a method for making a fuser member. In this method, a composite dispersion can be formed to include a plurality of diamond-containing particles and a polymer. The composite dispersion can then be deposited on a resilient layer to form an interfacial layer, while the resilient layer is formed over a substrate. A second dispersion can be applied to the formed interfacial layer and can be treated at a temperature of about 250° C. or higher to form a surface layer on the interfacial layer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
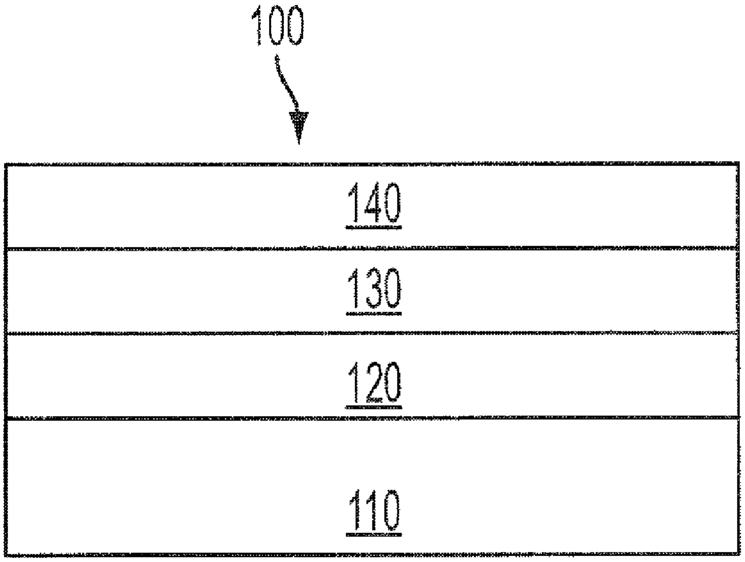
FIG. 1 depicts a portion of an exemplary fuser member in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B. The term “at least one of” is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of “less than 10” can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide a fuser member containing an interfacial layer and methods for forming the interfacial layer and the fuser member. In one embodiment, the fuser member can include a substrate, a resilient layer, a surface layer and an interfacial layer disposed between the resilient layer and the surface layer. The resilient layer can include, for example, a silicone rubber layer and the surface layer can include, for example, a fluoropolymer such as a fluoroplastic of PFA or PTFE. The interfacial layer can include a diamond-containing polymer composite. The surface layer and the fuser member can thus be treated at a temperature of about 250° C. or higher.

Although the term "fuser member" is used herein for illustrative purposes, it is intended that the term "fuser member" also encompasses other members useful for an electrostatographic printing process including, but not limited to, a fixing member, a pressure member, a heat member and/or a donor member. The "fuser member" can be in a form of, for example, a belt, a plate, a sheet, a roll or the like.

For example, various embodiments can also include an image rendering device that uses a fusing apparatus including a fuser member and a pressure member, wherein at least one of the fuser member and the pressure member can include one layer formed by dispersing a plurality of diamond-containing particles in a polymer matrix. The image rendering device can further include an image applying component (e.g., a photoreceptor) for applying an image to a copy substrate (a sheet of paper) and a fusing apparatus which receives the copy substrate with the applied image from the image applying component and fixes the applied image more permanently to the copy substrate. The fuser member and the pressure member of the fusing apparatus can define a nip therebetween for receiving the copy substrate therethrough.

FIG. 1 depicts a portion of an exemplary fuser member 100 in accordance with the present teachings. It should be readily apparent to one of ordinary skill in the art that the member 100 depicted in FIG. 1 represents a generalized schematic illustration and that other components/layers/films/particles can be added or existing components/layers/films/particles can be removed or modified.

As shown, the fuser member 100 can include a substrate 110, a resilient layer 120, an interfacial layer 130 and a surface layer 140. The surface layer 140 can be formed over the resilient layer 120, which can in turn be formed over the substrate 110. The disclosed interfacial layer 130 can be formed between the resilient layer 120 and the surface layer 140 in order to provide desired properties, e.g., thermal stabilities, for forming and/or using the fuser member 100 at a temperature of about 250° C. or higher.

The substrate 110 can be in a form of, for example, a belt, plate, and/or cylindrical drum for the disclosed fuser member 100. In various embodiments, the substrate 110 can include a wide variety of materials, such as, for example, metals, metal alloys, rubbers, glass, ceramics, plastics, or fabrics. In an additional example, the metals used can include aluminum, anodized aluminum, steel, nickel, copper, and mixtures thereof, while the plastics used can include polyimides, polyester, polyetheretherketone (PEEK), poly(arylene ether)s, polyamides and mixtures thereof. In certain embodiments, the substrate 110 can be, e.g., aluminum cylinders or aluminum fuser rolls having silicone rubber formed thereon.

The resilient layer 120 can include, for example, a silicone rubber layer; and the surface layer 140 can include, for example, fluoroplastics such as PFA, and/or PTFE, depending on specific applications. In various embodiments, materials and/or methods as known to one of ordinary skill in the art for the resilient layer and/or the surface layer of a conventional fuser member can be used for the disclosed fuser member 100. In various embodiments, the surface layer 140 can be a fluoropolymer including, but not limited to, for example, polytetrafluoroethylene, copolymer of tetrafluoroethylene and hexafluoropropylene, copolymer of tetrafluoroethylene and perfluoro(propyl vinyl ether), copolymer of tetrafluoroethylene and perfluoro(ethyl vinyl ether), copolymer of tetrafluoroethylene and perfluoro(methyl vinyl ether), and copolymer of tetrafluoroethylene, hexafluoropropylene and vinylidenefluoride.

The interfacial layer 130 can be formed between the resilient layer 120 and the surface layer 140 so as to facilitate the film quality of the resilient layer 120, or the surface layer 140; and/or to facilitate the adhesion therebetween. In addition, the interfacial layer 130 can provide improved thermal/electrical/mechanical properties due to use of the diamond-containing composite. Useful life of the fuser member 100 can thus be improved.

In various embodiments, the interfacial layer 130 can include a plurality of diamond-containing particles dispersed in a polymer matrix to provide an improved thermal stability, mechanical robustness, and/or electrical conductivity of the fuser member 100. In various embodiments, the interfacial layer 130 can thermally and/or mechanically protect the resilient layer 120 during the formation and/or use of the member 100. For example, when the member 100, such as the surface layer 140 that is formed over the interfacial layer 130, is treated at a temperature of about 250° C. or higher, defect formation can be reduced and/or eliminated for the resilient layer 120 due to the overlaying interfacial layer 130.

As used herein, the "polymer matrix" used for the interfacial layer 130 can include one or more chemically or physically cross-linked polymers, such as, for example, thermoplastics, thermoelastomers, resins, polyperfluoroether elastomers, silicone elastomers, thermosetting polymers or other cross-linked materials. In various other embodiments, the polymers can include, for example, fluorinated polymers (i.e., fluoropolymers) including, but not limited to, fluoroelastomers (e.g. Viton), fluorinated thermoplastics including fluorinated polyethers, fluorinated polyimides, fluorinated polyetherketones, fluorinated polyamides, or fluorinated polyesters. In various embodiments, the one or more cross-linked polymers can be semi-soft and/or molten to mix with the diamond-containing particles.

In various embodiments, the polymer matrix can include fluoroelastomers, e.g., having a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof.

Commercially available fluoroelastomer can include, for example, such as Viton A® (copolymers of hexafluoropropylene (HFP) and vinylidene fluoride (VDF or VF2)), Viton®-B, (terpolymers of tetrafluoroethylene (TFE), vinylidene fluoride (VDF) and hexafluoropropylene (HFP)); and Viton®-GF, (tetrapolymers including TFE, VF2, HFP and a brominated peroxide cure site), as well as Viton E®, Viton E 60C®, Viton E430®, Viton 910®, Viton GH® and Viton GF®. The Viton® designations are Trademarks of E.I. DuPont de Nemours, Inc. Still other commercially available fluoroelastomer can include, for example, Dyneon™ fluoroelastomers from 3M Company. Additional commercially available materials can include Aflas® a poly(propylene-tetrafluoroethylene) and Fluorel II® (LII900) a poly(propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Solvay Solexis.

In one embodiment, the polymer matrix can include a vinylidene-fluoride-containing fluoroelastomer cross-linked with an effective curing agent (also referred to herein as a cross-linking agent, bonding agent, or cross-linker), that includes, but is not limited to, a bisphenol compound, a diamino compound, an aminophenol compound, an amino-siloxane compound, an amino-silane and a phenol-silane compound.

An exemplary bisphenol cross-linker can include Viton® Curative No. 50 (VC-50) available from E. I. du Pont de Nemours, Inc. Curative VC-50 can contain Bisphenol-AF as a cross-linker and diphenylbenzylphosphonium chloride as an accelerator. Bisphenol-AF is also known as 4,4'-(hexafluoroisopropylidene)diphenol.

Cross-linked fluoropolymers can form elastomers that are relatively soft and display elastic properties. In a specific embodiment, the polymer matrix used for the interfacial layer can include Viton-GF® (E. I. du Pont de Nemours, Inc.), including tetrafluoroethylene (TFE), hexafluoropropylene (HFP), vinylidene fluoride (VF2), and a brominated peroxide cure site.

In various embodiments, the polymer matrix for the interfacial layer 130 can include a fluororesin including, but not limited to, polytetrafluoroethylene, copolymer of tetrafluoroethylene and hexafluoropropylene, copolymer of tetrafluoroethylene and perfluoro(propyl vinyl ether), copolymer of tetrafluoroethylene and perfluoro(ethyl vinyl ether), and copolymer of tetrafluoroethylene and perfluoro(methyl vinyl ether). In various embodiments, the polymer matrix can include cured silicone elastomers.

Figure 1A:
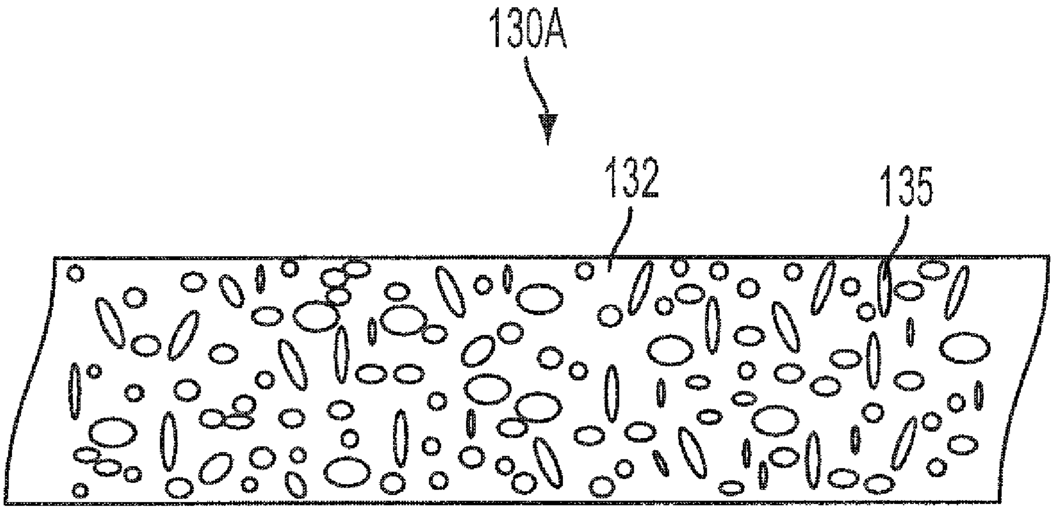
FIG. 1A is a schematic showing an exemplary interfacial layer used for the fuser member in FIG. 1 in accordance with the present teachings.

FIG. 1A is a schematic showing an exemplary interfacial layer 130A used for the fuser member in FIG. 1 in accordance with the present teachings. It should be readily apparent to one of ordinary skill in the art that the interfacial layer depicted in FIG. 1A represent a generalized schematic illustration and that other particles/fillers/layers can be added or existing particles/fillers/layers can be removed or modified.

In FIG. 1A, the plurality of diamond-containing particles 135 can be dispersed within an exemplary polymer matrix 132. In various embodiments, the plurality of diamond-containing particles 135 can be dispersed uniformly and spatially-controlled throughout the polymer matrix 132 of the interfacial layer 130A.

In various embodiments, the matrix polymer material 132 can account for at least 60% by weight and, in one embodiment, at least about 80% or at least about 90% by weight of the interfacial layer 130(A). The plurality of diamond-containing particles 135 can be at least about 0.01% by weight of the interfacial layer 130(A) and, in some embodiments, at least about 0.5% or at least about 1% by weight of the interfacial layer 130(A). In various embodiments, the diamond-containing particles 135 can be present in the interfacial layer 130 at up to about 20% by weight, such as at about 10 wt % or less of the interracial layer 130.

In various embodiments, the diamond-containing particles 135 can include nano-diamond particles, diamond particles having a size in the nanometer range. It should be noted that size ranges can vary depending on a particular use or configuration of a particular member. In one embodiment, however, nano-diamond particles can range in size of about 1000 nm (1 micron) or less. In another embodiment, nano-diamond particles can range in size from about 1 nm to about 100 nm. In yet another embodiment, nano-diamond particles can range in size from about 10 nm to about 50 nm.

As used herein, average particle size refers to the average size of any characteristic dimension of a diamond-containing particle (or other filler particle) based on the shape of the particle(s), e.g., the median grain size by weight ($d_{50}$) as known to one of ordinary skill in the art. For example, the average particle size can be given in terms of the diameter of substantially spherical particles or nominal diameter for irregular shaped particles. Further, the shape of the particles is not limited in any manner. Such nano-particles can take a variety of cross-sectional shapes, including round, oblong, square, euhedral, etc.

In various embodiments, the diamond-containing particles 135 can be in a form of, for example, nanospheres, nanotubes, nanofibers, nanoshafts, nanopillars, nanowires, nanorods, and nanoneedles and their various functionalized and derivatized fibril forms, which include nanofibers with exemplary forms of thread, yarn, fabrics, etc. In various other embodiments, the diamond-containing particles can be in a form of, for example, spheres, whiskers, rods, filaments, caged structures, buckyballs (such as buckminsterfullerenes), and mixtures thereof.

In various embodiments, the diamond-containing particles, or the nano-diamond particles, can have a particle hardness of at least about 9 on the Mohs hardness scale and, in some embodiments, at least about 9.7 to 10, in the case of pure diamond particles, which is the maximum value on the Mohs hardness scale.

In addition to having a Mohs hardness in excess of 9, the nano-diamond particles can have a thermal conductivity which aids the transfer of heat through the interfacial layer 130(A) of the member 100. Specifically, the diamond-containing particles 135 can increase the thermal conductivity of the layer as compared to a layer without diamond particles. Thermal conductivity is the quantity of heat transmitted, due to unit temperature gradient, in unit time under steady conditions in a direction normal to a surface of unit area, when the heat transfer is dependent only on the temperature gradient. An increase in the thermal conductivity of the interfacial layer 130(A) over that of a conventional layer of a fuser member can allow for more rapid warm-up of the fuser member 100. For example, silicone rubbers and Teflon® typically have a relatively low thermal conductivity of about 0.002 W/cm-K, while the thermal conductivity of diamond can vary from about 6 to about 50 W/cm-K, at room temperature, depending on its purity. The amount by which the diamond particles raise the thermal conductivity of the interfacial layer 130 can depend on the particle concentration and particle size as well as the purity of the particles. In this manner, the thermal conductivity of the interfacial layer 130 can be increased over that of a comparable layer in which particles of conventional materials of a similar loading and particle size are employed.

Figure 1B:
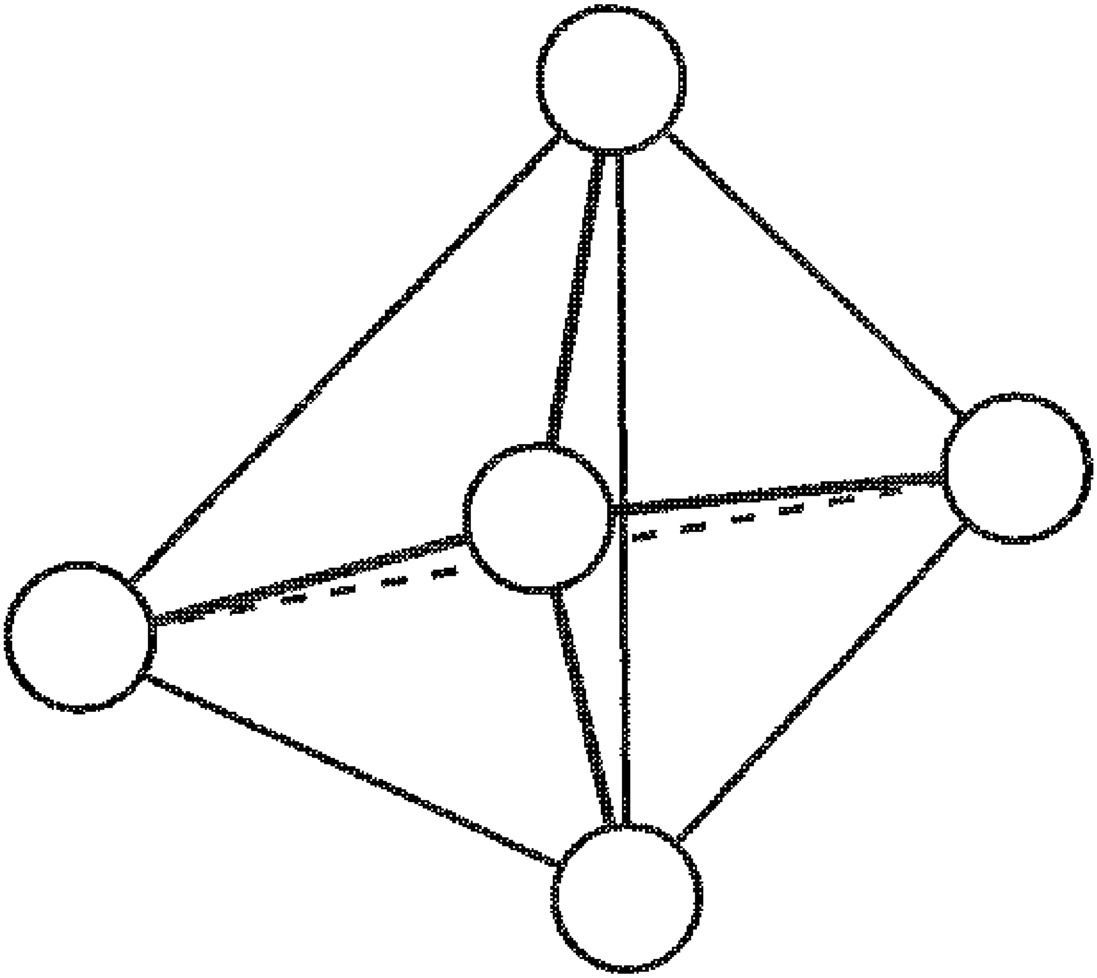
FIG. 1B is a schematic showing an exemplary diamond structure.

The diamond-containing particles 135 can be formed from natural or synthetic diamond or a combination thereof. Natural diamonds typically have a face-centered cubic crystal structure in which the carbon atoms are tetrahedrally bonded, which is known as $sp^3$ bonding. Specifically, each carbon atom can be surrounded by and bonded to four other carbon atoms, each located on the tip of a regular tetrahedron. Further, the bond length between any two carbon atoms is 1.54 angstroms at ambient temperature conditions, and the angle between any two bonds is 109 degrees. The density of natural diamond is about 3.52 glcm$^3$. A representation of carbon atoms bonded in a normal or regular tetrahedron configuration in order to form diamond is shown in FIG. 1B. In one embodiment, nano-diamonds can be produced by detonation of diamond blend, for example, followed by a chemical purification.

Synthetic diamond is industrially-produced diamond which is formed by chemical or physical processes, such as chemical vapor deposition or high pressures. Like naturally occurring diamond, the synthetic diamond can include a three-dimensional carbon crystal. Note that synthetic diamond is not the same as diamond-like carbon, which is an amorphous form of carbon.

Examples of synthetic diamond which can be useful for the exemplary embodiments can include polycrystalline diamond and metal bond diamond. Polycrystalline diamond can be grown by chemical vapor deposition as a flat wafer of, e.g., up to about 5 mm in thickness and up to about 30 cm in diameter or in some cases, as a three-dimensional shape. Polycrystalline diamond can have a popcorn-like structure. The diamond is usually black but can be made completely transparent. The crystal structure can be octahedral. Metal bond forms of synthetic diamond can be formed by pressing a mixture of graphite and metal powder for extended periods at high pressure. For example, a nickel/iron based metal bond diamond is produced by placing a graphite and nickel iron blended powder into a high pressure high temperature (HPHT) press for a sufficient period of time to form a product which imitates natural diamond. Other metals, such as cobalt, can also be used. After the diamond is removed from the press, it is subjected to a milling process. A chemical and thermal cleaning process can be utilized to scrub the surfaces. It may then be micronized to provide a desired size range. The particles thus formed can be flakes or tiny shards, with no consistent shape. The crystal structure can be monocrystalline, as for natural diamond.

The diamond-containing particles 135 can be primarily formed of diamond, natural or synthetic diamond. That is, the diamond-containing particles can include at least 50% diamond and generally at least 80% or at least 90% diamond and, in some embodiments at least 95% diamond and, in other embodiments, greater than 99% diamond, such as pure diamond. In particular, the diamond-containing particles can include at least 50% by weight of crystalline carbon and, in some embodiments, at least 80% or at least 90% or at least 95% crystalline carbon.

In various embodiments, nano-diamond particles can be commercially available in a form of powder or dispersion, for example, from NANOBLOX, Inc. (Boca Raton, Fla.). For example, raw nano diamond black (NB50) can possess 50% of sp3 carbon and 50% of sp$^2$ carbon (sp$^3$ core and sp$^2$ envelop, BET ~460 m$^2$/g); while nano diamond grey (NB90) can possess 90% of sp$^3$ carbon and 10% of sp$^2$ carbon.

In various embodiments, the plurality of diamond-containing particles 135, or the nano-diamond particles, can be surface modified to provide functional surfaces. That is, the diamond surfaces can be chemically tunable for improved characteristics. In some embodiments, the nano-diamond particles can include a chemically inertia diamond hard core that has a chemically active surface. The active diamond surface can include a spectrum of functional chemical groups including, but not limited to, methyl, —OH, —COOH, —$NH_2$ or quaternerized amine groups, which can be directly linked to carbon structures. In one embodiment, the active surface can include C of about 76%, 0 of about 6% and N of about 10%. In various embodiments, metal modified nano-diamonds can also be commercially available, for example, supplied by Nanoblox, Inc., Boca Raton, Fla. Metals that can be used to modify the diamond-containing particles can include, but are not limited to, Cu, Fe, Ag, Au, and Al.

Referring back to FIGS. 1-1A, the diamond-containing particles 135 can be used as a filler material distributed within the polymer matrix 132 to substantially control, e.g., enhance, the physical properties, such as, for example, thermal/electrical conductivities, and/or mechanical robustness of the resulting polymer matrices. The resulting material can be used as, for example, a fuser material in a variety of fusing subsystems and embodiments.

In various embodiments, the interfacial layer 130 can further include other fillers, such as inorganic particles, in the diamond-containing composite dispersion. In various embodiments, the inorganic particles can include, but are not limited to, metal oxides, non-metal oxides, metals, or other suitable particles. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof. The non-metal oxides can include, for example, boron nitride, silicon carbides (SiC) and the like. The metals can include, for example, nickel, copper, silver, gold, zinc, iron and the like. In various embodiments, other additives known to one of ordinary skill in the art can also be included in the diamond-containing coating composites.

In various embodiments, a diamond/polymer composite dispersion can be used to form the disclosed interfacial layer 130. The composite dispersion can be prepared to include, for example, an effective solvent, in order to disperse the plurality of diamond-containing particles, one or more polymers and/or corresponding curing agents; and optionally, inorganic filler particles or surfactants that are known to one of the ordinary skill in the art.

Effective solvents can include, but are not limited to, methyl isobutyl ketone (MIBK), acetone, methyl ethyl ketone (MEK), and mixtures thereof. Other solvents that can form suitable dispersions can be within the scope of the embodiments herein.

Various embodiments can thus include methods for forming the fuser member 100 in accordance with the present teachings. During the formation, various layer-forming techniques, such as, for example, coating techniques, extrusion techniques and/or molding techniques, can be applied respectively to the substrate 110 to form the resilient layer 120, to the resilient layer 120 to form the interfacial layer 130, and/or to the interfacial layer 130 to form the surface layer 140.

As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed. For example, the composite dispersion for forming the interfacial layer 130 and a second dispersion for forming the surface layer 140 can be respectively coated on the resilient layer 120 and the formed interfacial layer 130 by spray-coating with an airbrush. In various embodiments, gap coating can be used to coat a flat substrate, such as a belt or plate, whereas flow coating can be used to coat a cylindrical substrate, such as a drum or fuser roll or fuser member substrate.

In various embodiments, the disclosed fuser member 100 can include an interfacial layer 130 having a thickness of about 0.1 micrometer to about 100 micrometers; a surface layer 140 having a thickness of about 1 micrometer to about 200 micrometers; and a resilient layer 120 having a thickness of about 2 micrometers to about 10 millimeters.

Figure 2:
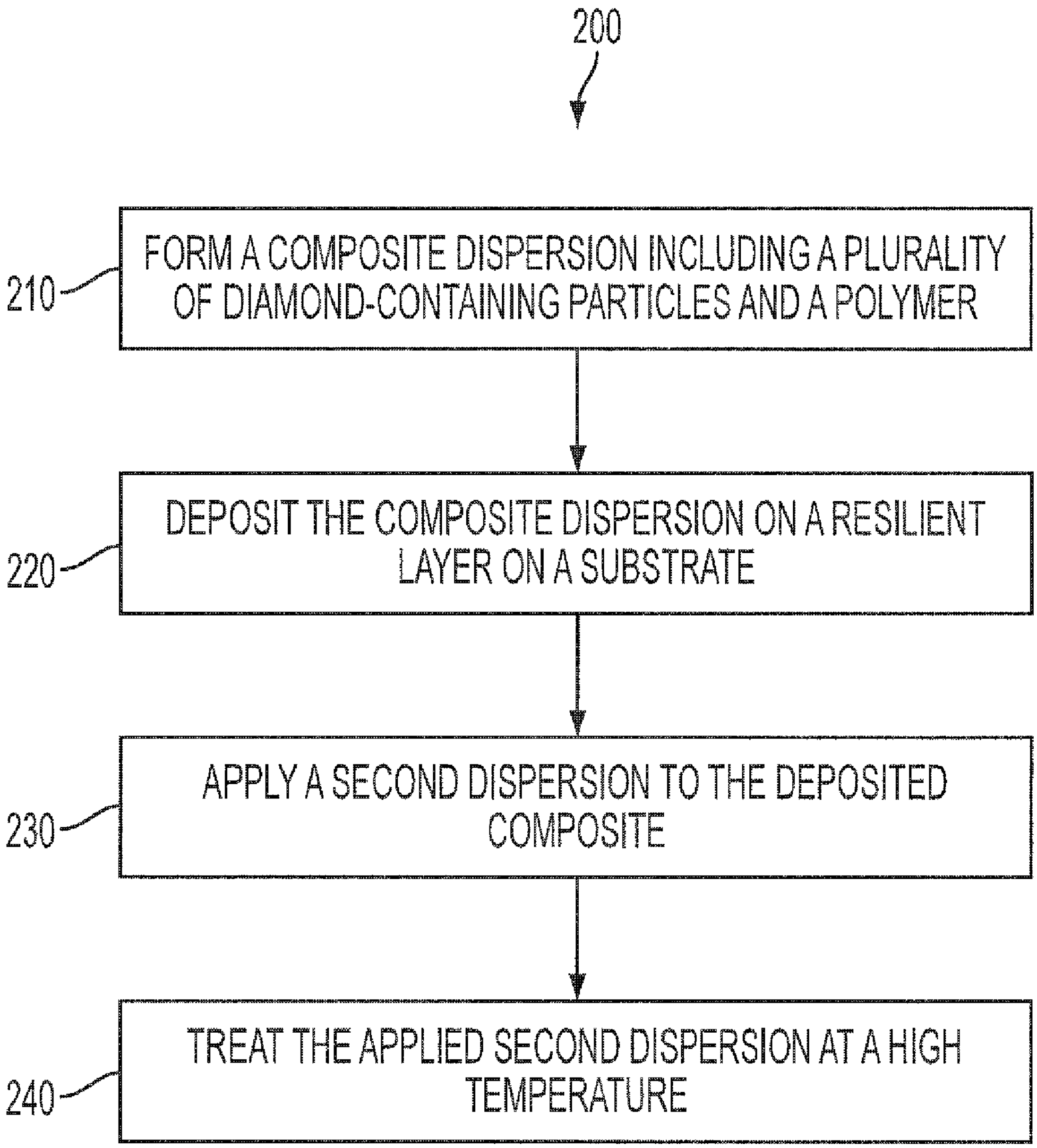
FIG. 2 depicts an exemplary method for forming the fuser member of FIG. 1 in accordance with the present teachings.

FIG. 2 depicts an exemplary method 200 for forming the fuser member 100 of FIG. 1 in accordance with the present teachings. While the method 200 of FIG. 2 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein. Also, not all illustrated steps may be required to implement a methodology in accordance with one or more aspects or embodiments of the present invention. Further, one or more of the acts depicted herein may be carried out in one or more separate acts and/or phases.

At 210 of FIG. 2, a composite dispersion that includes a plurality of diamond-containing particles and a polymer can be formed. For example, the composite dispersion can include a fluoropolymer (e.g., Viton), diamond-containing particles, curing agents (e.g., a bisphenol curing agent VC-50), and optionally inorganic fillers (e.g., MgO) in an organic solvent (e.g., MIBK).

At 220, the diamond/polymer composite dispersion can be deposited, coated, or extruded on a resilient layer. In various embodiments, the resilient layer (also see 120 of FIG. 1) can be formed on a substrate (also see 110 of FIG. 1) of a conventional fuser member and can be formed by, e.g., molding an exemplary silicone rubber on the substrate. The disclosed composite dispersion can then be, for example, flow-coated on the exemplary silicone rubber layer and can be partially or wholly evaporated for a time length followed by a curing process to form the interfacial layer (also see 130 of FIGS. 1-1A). The curing process can be determined by the polymer (s) and the curing agent(s) used.

The curing process for forming the interfacial layer 130 can include, for example, a step-wise curing process. In an exemplary embodiment, a coated/extruded/molded diamond/polymer composite dispersion can be placed in a convection oven at about 49° C. for about 2 hours; the temperature can be increased to about 177° C. and further curing can take place for about 2 hours; the temperature can be increased to about 204° C. and the coating can further be cured at that temperature for about 2 hours; and lastly, the oven temperature can be increased to about 232° C. and the coating can be cured for another 6 hours. Other curing schedules can be possible. Curing schedules known to those skilled in the art can be within the scope of embodiments herein.

At 230, a surface layer (also see 140 of FIG. 1) can be formed by applying a second dispersion to the deposited and/or cured diamond/polymer composite, followed by a thermal treatment at 240 of FIG. 2. For example, following the curing process for forming the interfacial layer, fluoroplastics dispersions prepared from PFA can be deposited onto the formed interfacial layer, for example, by spray- or powder-coating techniques. The surface layer deposition can then be baked at high temperatures of about 250° C. or higher, such as, for example, from about 350° C. to about 360° C.

In various embodiments, during the preparation of the interfacial layer 130, for example, at act 220 of FIG. 2, the solvent system or the dispersion system of the diamond/polymer composite, and/or the residence time of the deposition on the underlying resilient layer 120 can be controlled to achieve high deposition quality for the interfacial layer 130 and to obtain desirable interfacial adhesion between layers of the fuser member 100.

In various embodiments, when preparing the interfacial layer 130 and the surface layer 140 over the resilient layer 120, the baking (or curing) process of the interfacial layer 130 and the surface layer 140 can be combined.

In this manner, because the interfacial layer 130 can provide high-temperature thermal stabilities and mechanical robustness, the high temperature baking or curing of the surface layer 140 can be performed to provide high quality to the fuser member 100, for example, without generating any defects within the underlying resilient layer 120 and the formed surface layer 140. In addition, due to the interfacial layer 130, the fuser member 100 can possess, for example, improved adhesion between layers, stability of depositions, improved thermal conductivities, improved electrical conductivities, and a long lifetime.

EXAMPLES

Example 1

Preparation of an Interfacial Layer Containing Diamond/Viton Composite

A composite coating dispersion was prepared by milling the nano diamond and Viton in an organic solvent of methyl isobutyl ketone (MIBK) using 2-mm stainless shots at 200 rpm for 18 hours. The diamond/Viton nanocomposite dispersion included 10 wt % of nano diamond NB90 (90% of $sp^3$ carbon and 10% of $sp^2$ carbon available from Nanoblox Inc., Boca Raton, Fla.) and 89 wt % of Viton® GF as well as 1 wt % of bisphenol curing agent VC-50 (Viton® Curative No. 50 available from E. I. du Pont de Nemours, Inc., Wilmington, Del.).

After filtration through a 20 μm Nylon cloth, uniform nanocomposite dispersion was obtained and then coated on an exemplary glass plate to form a film via a draw bar coating process.

Following the coating process of the nanocomposite dispersion, a curing process was performed at ramp temperatures of about 49° C. for about 2 hours, and at about 177° C. for about 2 hours, then at about 204° C. for about 2 hours and then at about 232° C. for about 6 hours for a post cure.

As a result, a 20 μm-thick nanocomposite film was obtained and examined to have a uniform surface (results not shown).

Example 2

Preparation of a Fuser Member

The interfacial layer was flow- or dip-coated and then cured on top of a conventional silicone rubber layer of a fuser roll. The PFA topcoat was used as a surface layer and was prepared by spray- or powder-coating a PFA (TE-7224 available from E. I. du Pont de Nemours, Inc., Wilmington, Del.) aqueous dispersion on top of the interfacial layer that is formed in Example 1, followed by baking at high temperature of about 350° C. for 10 min.

Example 3

Surface Resistivity of an Interfacial Layer

The surface resistivity of the formed interfacial layer of the Example 1 was measured at varying spots of the film, at a temperature of about 72° F., and at a room humidity of about 65% using a High Resistivity Meter (Hiresta-Up MCP- HT450, Mitsubishi Chemical Corp., Tokyo, Japan), and the results were shown in Table 1.

TABLE 1

| | Surface Resistivity (Ω/sq) |
|---|---|
| The Viton layer | >$10^{16}$ |
| The nano diamond/ Viton interfacial layer | $(5.46 \pm 0.09) \times 10^{10}$ |

As shown, the examined interfacial layer was electrically conductive for about six orders of magnitude over a pure Viton layer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fuser member comprising:

a substrate;

a resilient layer disposed over the substrate;

an interfacial layer disposed over the resilient layer, wherein the interfacial layer comprises a plurality of diamond-containing particles dispersed in a polymer matrix; and a baked surface layer disposed over the interfacial layer.

2. The member of claim 1, wherein the polymer matrix of the interfacial layer comprises one or more polymers selected from the group consisting of silicone elastomers, fluoropolymers, polyperfluoroethers, fluorinated polyethers, fluorinated polyimides, fluorinated polyetherketones, fluorinated polyamides, or fluorinated polyesters.

3. The member of claim 2, wherein the fluoropolymer comprises a fluoroelastomer comprising a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof.

4. The member of claim 3, wherein the fluoroelastomer comprises a vinylidene fluoride-containing fluoroelastomer cross-linked with a curing agent that is selected from a group consisting of a bisphenol compound, a diamino compound, an aminophenol compound, an amino-siloxane compound, an amino-silane, and phenol-silane compound.

5. The member of claim 2, wherein the fluoropolymer comprises a fluoroplastics selected from the group consisting of polytetrafluoroethylene, copolymer of tetrafluoroethylene and hexafluoropropylene, copolymer of tetrafluoroethylene and perfluoro(propyl vinyl ether), copolymer of tetrafluoroethylene and perfluoro(ethyl vinyl ether), and copolymer of tetrafluoroethylene and perfluoro(methyl vinyl ether).

6. The member of claim 1, wherein the plurality of diamond-containing particles comprise at least about 60% of diamond by weight, the diamond comprising a natural diamond, a synthetic diamond or combinations thereof.

7. The member of claim 1, wherein the plurality of diamond-containing particles have a hardness of at least about 9 on the Mohs hardness scale.

8. The member of claim 1, wherein the plurality of diamond-containing particles have an average particle size of about 1 micrometer or less.

9. The member of claim 1, wherein each particle of the plurality of diamond-containing particles comprises —$CH_3$, —OH, —COON, —$NH_2$, quarternized amine, Cu, Fe, Ag, Au, Al, or a combination thereof.

10. The member of claim 1, wherein the plurality of diamond-containing particles are present in the interfacial layer in an amount of at least 0.01 percent by weight.

11. The member of claim 1, wherein the interfacial layer further comprises one or more filler particles comprising metal oxides, silicon carbides, boron nitrides, and graphites, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof.

12. The member of claim 1, wherein the interfacial layer has a thickness ranging from about 0.1 micrometer to about 100 micrometers; the surface layer has a thickness ranging from about 1 micrometer to about 200 micrometers; and the resilient layer has a thickness ranging from about 2 micrometers to about 10 millimeters.

* * * * *